May 16, 1944.  D. F. WARNER  2,348,768
CONTROL MECHANISM
Original Filed Jan. 6, 1940  2 Sheets-Sheet 1

Inventor:
Donald F. Warner,
by Harry E. Dunham
His Attorney.

May 16, 1944.   D. F. WARNER   2,348,768
CONTROL MECHANISM
Original Filed Jan. 6, 1940   2 Sheets-Sheet 2
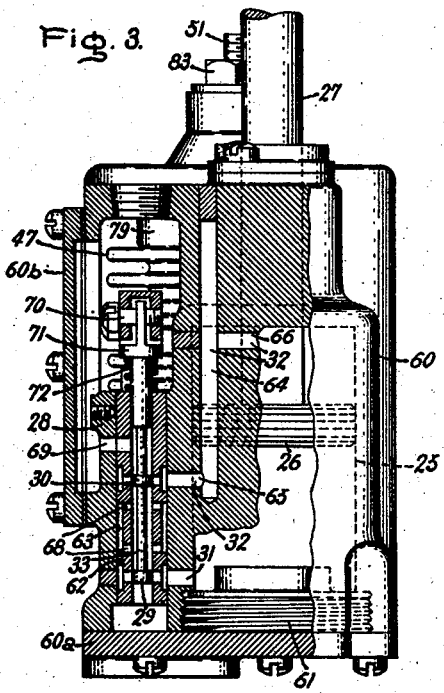
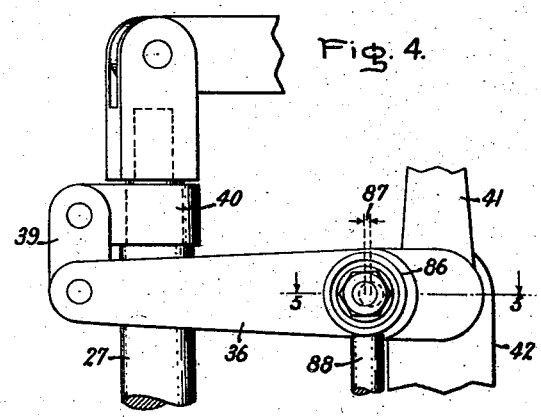
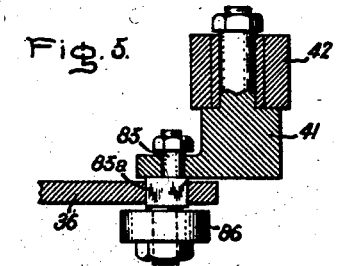
Inventor:
Donald F. Warner,
by Harry E. Dunham
His Attorney.

Patented May 16, 1944

2,348,768

UNITED STATES PATENT OFFICE 2,348,768

CONTROL MECHANISM

Donald F. Warner, Swampscott, Mass., assignor to General Electric Company, a corporation of New York Original application January 6, 1940, Serial No. 312,721. Divided and this application July 23, 1942, Serial No. 452,024

4 Claims. (Cl. 121—41)

This application is a division of my application, Serial No. 312,721 on control arrangement for superchargers and the like, filed January 6, 1940.

The present invention relates to control mechanisms, more particularly to hydraulic control mechanisms including a pilot valve for controlling the flow of operating medium to a hydraulic motor in response to changes of an operating condition of a machine to be controlled such as the pressure of air supplied to a combustion engine.

The object of my invention is to provide an improved construction and arrangement of control mechanisms, rugged in construction, compact in design, and especially adapted for use on aircraft.

For a consideration of what I believe to be novel and my invention, attention is directed to the following description and the claims appended thereto in connection with the accompanying drawings.

Figure 2:
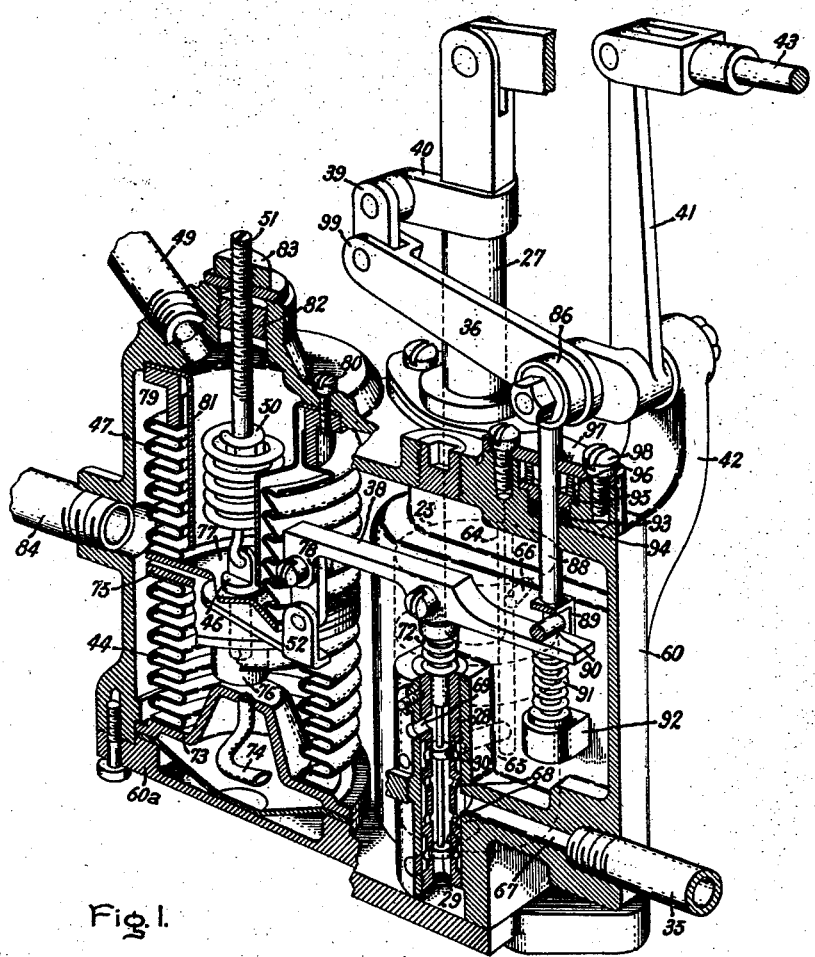
Figure 1:
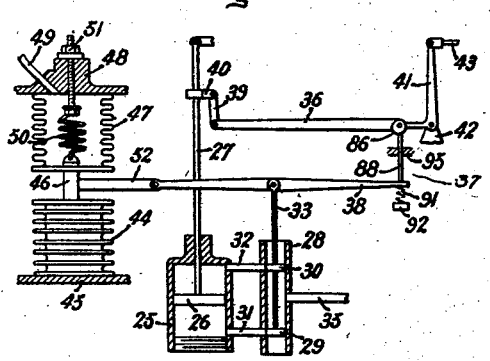

In the drawings Fig. 1 illustrates a diagrammatic explanatory view of a mechanism embodying my invention; Fig. 2 illustrates a perspective view of a control mechanism in accordance with my invention; Fig. 3 is a plane front view, partly broken away, of Fig. 2; Fig. 4 is an enlarged detail view of a part of Fig. 2; and Fig. 5 is a section along line 5—5 of Fig. 4.

A control mechanism according to my invention, as diagrammatically indicated in Fig. 1, comprises a hydraulic motor 25 with a piston 26 secured to the end of a stem 27 for connection to an element to be controlled, and a control member or pilot valve 28 with valve heads 29 and 30 for controlling the supply and discharge of operating fluid under pressure through channels 31 and 32 respectively. The valve heads 29 and 30 are secured to a stem 33. Operating fluid under pressure is supplied to the pilot valve by a supply conduit 35. During operation, upward movement of the pilot valve heads causes flow of fluid under pressure to the upper portion of the cylinder 25 through the conduit 32 and discharge of fluid from the lower portion of the cylinder 25 through the conduit 31 whereby the piston 26 is moved downward. The restoring action of the pilot valve is accomplished in known manner in response to movement of the hydraulic motor piston 26 by means of a restoring lever 36 which has an intermediate point connected by a link means to the right-hand end of a floating lever 38. The latter has an intermediate point connected to the pilot valve stem 33. The left-hand end of the lever 36 is connected by a link 39 to a lug 40 fastened to the stem 27. With this arrangement downward movement of the pilot valve causes upward movement of the hydraulic motor piston 26 and its stem 27. The follow-up lever 36 is turned upward about its right-hand end. This causes upward movement of the lever 38 about its left-hand end whereby the original position of the pilot valve heads is restored.

The lever 36 in addition to its restoring function also serves as a control lever. To this end its right-hand end is connected to one arm of a bell-crank lever 41 held on a fulcrum 42 and having another arm pivotally connected to a link or control member 43. The link 43 may be moved by an operator or pilot to change the load output of the engine.

The left-hand end of the floating lever 38 is connected to a device responsive to changes of a condition to be controlled, in the present instance the absolute pressure in a container, not shown. This device comprises a hermetically sealed, evacuated bellows 44 held at its lower end on a support 45 and mechanically connected at its upper end to a stem or pin 46. The latter is also connected to the lower end of a bellows 47 having an upper end held on a fixed support 48. The bellows 47 communicates through a pipe 49 with a container of fluid under pressure such as a conduit for conducting air under pressure to a combustion engine (not shown) and thereby moves during operation in response to pressure changes in such container. The range of pressure over which the mechanism or regulator will control may be varied by an adjustable tension spring 50 disposed within the bellows and connected between an extension of the aforementioned stem 46 and an adjustable bolt and nut 51. The stem 46 has an arm or lug 52 pivotally connected to the left-hand end of the lever 38.

During operation an increase in pressure in the pipe 49 causes expansion of the bellows 47 whereby its lower end is moved downward and causes downward movement of the pilot valve 28, thus admitting fluid under pressure to the lower side of the hydraulic motor piston 26 and discharge of fluid under pressure from the upper side thereof, resulting in upward movement of the piston 26 and the stem 27 connected thereto. Upward movement of the stem 27 effects movement of an element to be controlled and simultaneously causes restoring of the normal pilot valve position through the follow-up connection 36, 37 and 38. Similarly, a decrease in pressure in the pipe 49 causing collapsing of the bellows 47 results in downward movement of the piston 26 and the stem 27 connected thereto. If during operation the pressure in the pipe 49 remains constant and the atmospheric pressure decreases or increases, the bellows 44 will collapse and expand respectively, resulting in movement of the hydraulic motor piston 26. As best shown in Fig. 2, the mechanism forms a compact structure with the various elements supported on and partly formed by and enclosed in a casing 60. The casing 60 has a detachable bottom 60a and a detachable side plate 60b (Fig. 3) and is machined to form the bore of the hydraulic cylinder 25 closed at its lower end by a plug 61. The pilot valve 28 includes a sleeve 62 inserted in a bore 63 of the casing 60. The conduit 31 between the hydraulic motor 25 and the pilot valve 28 is formed by a horizontal bore in the casing and the conduit 32 is formed by a vertical bore 64 connected by a lower horizontal bore 65 to the pilot valve and by an upper horizontal bore 66 to the hydraulic cylinder. Fluid is supplied to the pilot valve by the conduit 35 connected to a channel 67 in the casing 60 and ports 68 in the sleeve 62. During operation fluid from the hydraulic motor 25 is discharged in response to upward movement of the pilot valve heads from the open lower end of the pilot valve sleeve 62 directly into the interior of the casing 60. Upon downward movement of the pilot valve heads, fluid is discharged from the hydraulic cylinder 25 through a port 69 formed in the sleeve and the casing.

The upper end of the pilot valve stem is connected to the lever 38 by a pivot 70 (Fig. 3). In order to reduce or eliminate play between the pivot 70 and the pilot valve stem 33 an abutment 71 formed on an upper portion of the stem 33 is biased upward by a spring 72 between the abutment and the upper face of the sleeve 62.

The evacuated bellows 44 has a lower end plate 73 dished inward and with a central portion connected to a small tube 74 through which the bellows is evacuated after assembly, the tube 74 being subsequently sealed. An upper end plate 75 of the bellows has a central projection 76 projecting into proximity of the dished-in portion of the lower plate 73. The projection 76 with said dished-in portion limits collapsing movement of the evacuated bellows. The upper bellows 47 has a lower end plate 77 which is secured to the upper end plate 75 of the evacuated bellows by means of the pin 46. The lug 52 has a portion securely held between the plates 75 and 77 and another upward bent portion connected to the left-hand end of the floating lever 38 by a link 78. The upper end of the bellows 47 is securely held on the casing 60 by a flanged ring 79 and a plurality of screws 80. Collapsing movement of the bellows 47 is limited by a flanged cylinder 81 located inside the bellows 47 with its lower portion extending to the proximity of the plate 77 and its upper flanged portion held between the ring 79 and the casing 60. The pipe 49 is connected into an opening of the casing communicating with the bellows 47. The spring 50 is held at its lower end on the pin 46 and at its upper end on the bolt 51 which passes through a nut 82 and a lock nut 83. Loosening of the lock nut 83 permits adjustment of the bolt or screw-threaded rod 51. The left-hand portion of the casing in Fig. 2 is connected to a drain conduit 84 through which operating fluid discharged from the hydraulic motor and the pilot valve is drained from the casing.

The right-hand end of the floating lever 38 is connected to the follow-up and control lever 36. This connection in the diagrammatic view of Fig. 1 is formed by link means 37. The follow-up movement of the lever 36, that is, the ratio of movement between the motor 25 and the pilot valve 28 is very small. In a particular arrangement which has been in operation this ratio is of the order of 1:200. To obtain such a reduction the distance between the connection of the link means 37 with the lever 36 and the right-hand end of this lever has to be about 1/200 of the total length of the lever 36. This is accomplished by my invention by a link or like connecting element engaging an eccentric on the right-hand end of the lever 36, that is, on the pivotal connection between the lever 36 and the bell crank 41.

The fulcrum 42 for supporting the bell crank 41 is formed by a bracket on the casing 60. One arm of the bell crank 41, as explained above, is pivotally connected to the operating link 43 and the other arm of the bell crank 41 is pivotally connected to the right-hand end of the lever 36. The pivot connection between the bell crank 41 and the lever 36 is formed by a pivot 85 rigidly secured to the lever 36 and prevented from rotation relative to the lever 36 by a square member 85a (Fig. 5) located in a square opening in the lever 36. The pivot 85 on one side of the square member 85a projects loosely through an opening in the bell crank 41. An eccentric 86 is formed on the other side of the square member 85a. The eccentric 86 is in the form of a cylindrical member secured to the lever 36 opposite the pivot 85 and off-center relative to the pivotal center or support. The eccentricity, that is, the distance between the centers of the pin 85 and the eccentric 86 is designated with the character 87 (Fig. 4). The eccentric 86 corresponds to the pivot between the link 37 and the lever 36 in Fig. 1. The lower central portion of the eccentric 86 engages the upper end of a rod 88 which has a lower, forked portion 89 with prongs on opposite sides of the lever 38 and a pin 90 between the prongs in engagement with the upper surface of the lever 38. The right-hand end of the lever 38 is biased upward into engagement with the pin 90 by a compression spring 91 held on a lug 92 (Fig. 2) formed by the casing 60. The spring 91 maintains engagement between the lever 38, the rod 88 and the eccentric 86.

The rod 88 is guided in a bearing formed by the casing 60. The rod 88 and the stem 27 of the hydraulic motor are the only movable elements passing through openings in the casing, the latter forming a bearing for each of these elements. Leakage of fluid along these bearings past the casing is reduced by packings. The packings for the rod 88 and the piston stem 77 are similar. As shown in Fig. 2 the packing for the rod 88 comprises a ring 93 of flexible fluid-retaining material located in a groove 94 of the casing and biased downward by a flanged ring 95 and a plurality of coiled springs 96 between the flanged ring 95 and a cover plate 97 fastened to the casing by screws 98.

The left-hand end of the lever 36 (Fig. 2) has a forked portion 99 connected by the link 39 to the lug 40 on the hydraulic motor stem 27. The forked connections between the various levers and links provide for a rigid construction and reduce undesirable movement of these elements due to play or clearances between them. Also, these forked connections and the bar-shaped lever and link constructions permit these elements to be made of light weight, an important consideration when used on aircraft.

The pilot valve 29, 30 may be moved automatically by action of the pressure responsive bellows 44, 47 or manually by actuation of the link 43. Thus, if the link 43 is moved to the right it causes clockwise turning of the bellcrank 41 about its fulcrum 42 whereby the eccentric 86 is turned upward, permitting upward movement of the rod 88 by action of the spring 91 and counterclockwise turning movement of the floating lever 38 about its left-hand end. This causes upward movement of the pilot valve 29, 30, resulting in downward movement of the piston 26 and the stem 27. Downward movement of the stem 27 causes counterclockwise turning of the lever 36 about the pivot 25, resulting in downward movement of the eccentric 86, which latter turns about the center of the pivot 85, thus forcing the rod 88 downward against the biasing force of the spring 91 and causing clockwise turning of the lever 38 about its left-hand end and downward movement of the pilot valve 39, 40. This follow-up or restoring action continues until the pilot valve heads 29, 30 have been restored to their original line-in-line position with the respective ports.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States, is:

1. A control mechanism comprising a controlling device, a floating lever connected to the device, a pilot valve connected to the lever, a hydraulic motor having a stem and being controlled by the pilot valve, and a follow-up mechanism between the stem and the floating lever including a lever connected to the stem, means pivotally supporting the lever, a cylindrical member secured to the lever off-center relative to the center of the pivotal support to form an eccentric, and means engaging the eccentric and the floating lever including a rod and a spring.

2. A control mechanism comprising a hydraulic motor having a piston with a stem, a pilot valve for controlling the motor, and a follow-up mechanism between the stem and the pilot valve comprising a control lever having one end connected to the stem and another end with a pivot on one side for connection to a control member, a cylindrical member secured to the other side of said other end and forming an eccentric relative to the pivot, and means for transmitting movement of the eccentric about the pivotal center to the pilot valve including a rod and a spring.

3. A control mechanism comprising a hydraulic motor having a stem, a pilot valve for controlling the flow of operating fluid to the motor, a floating lever connected to the pilot valve, a device subject to a condition to be controlled connected to the floating lever, and a follow-up mechanism between the stem and the pilot valve comprising a follow-up lever having one end connected to the stem, means including a pivot secured to the follow-up lever normally holding the other end of the follow-up lever in a fixed position, a cylindrical member supported on the other end to form an eccentric relative to the pivot, and means for transmitting movement of the eccentric to the floating lever including a rod loosely engaging the eccentric and spring means biasing the rod towards the eccentric.

4. A governing mechanism comprising a casing, a hydraulic motor having a cylinder formed in the casing and a piston projecting through an opening in the casing, a pilot valve for the motor disposed within the casing, a device located in the casing and responsive to a condition to be controlled, a floating lever within the casing connected to the device and the pilot valve, and means for positioning the floating lever independently of the movement of the device and for restoring the pilot valve to its neutral position in response to movement of the stem, said means comprising a follow-up lever having one end connected to the piston stem, a control member pivotally connected to the other end of the follow-up lever, an eccentric supported on the pivotal connections, and a rod engaging the eccentric and the floating lever.

DONALD F. WARNER.